United States Patent [19]
Andre et al.

(10) Patent No.: US 7,844,914 B2
(45) Date of Patent: Nov. 30, 2010

(54) ACTIVATING VIRTUAL KEYS OF A TOUCH-SCREEN VIRTUAL KEYBOARD

(75) Inventors: Bartley K. Andre, Menlo Park, CA (US); Bas Ording, San Francisco, CA (US); Greg Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 11/228,737

(22) Filed: Sep. 16, 2005

(65) Prior Publication Data
US 2006/0085757 A1    Apr. 20, 2006

Related U.S. Application Data

(63) Continuation-in-part of application No. 10/903,964, filed on Jul. 30, 2004.

(51) Int. Cl.
*G06F 3/048* (2006.01)

(52) U.S. Cl. .............. 715/773; 715/863

(58) Field of Classification Search ........ 715/863, 715/771, 773; 345/173
See application file for complete search history.

(56) References Cited

U.S. PATENT DOCUMENTS

| 3,333,160 A | 7/1967 | Gorski |
| 3,541,541 A | 11/1970 | Englebart |
| 3,662,105 A | 5/1972 | Hurst et al. ............... 178/18 |
| 3,798,370 A | 3/1974 | Hurst ....................... 178/18 |
| 4,246,452 A | 1/1981 | Chandler ................. 200/5 |
| 4,550,221 A | 10/1985 | Mabusth ................... 178/18 |
| 4,672,364 A | 6/1987 | Lucas ..................... 340/365 P |
| 4,672,558 A | 6/1987 | Beckes et al. ............ 364/518 |

(Continued)

FOREIGN PATENT DOCUMENTS

CA    1243096    10/1988    ............ 340/180

(Continued)

OTHER PUBLICATIONS

U.S. Appl. No. 10/840,862, filed May 6, 2004.

(Continued)

*Primary Examiner*—Boris Pesin
*Assistant Examiner*—Omar Abdul-Ali
(74) *Attorney, Agent, or Firm*—Morgan, Lewis & Bockius LLP (57) ABSTRACT

A method of operating a touch screen to activate one of a plurality of virtual keys is provided. A touch location is determined based on location data pertaining to touch input on the touch screen, wherein the touch input is intended to activate one of the plurality of virtual keys. Each of the plurality of virtual keys has a set of at least one key location corresponding to it. For each of the virtual keys, a parameter (such as physical distance) is determined for that virtual key that relates the touch location and the set of at least one key location corresponding to that virtual key. The determined parameters are processed to determine one of the virtual keys. For example, the determined one virtual key may be the virtual key with a key location (or more than one key location, on average) being closest to the touch location. A signal is generated indicating activation of the determined one of the virtual keys.

49 Claims, 6 Drawing Sheets

U.S. PATENT DOCUMENTS

| | | | |
|---|---|---|---|
| 4,692,809 A | 9/1987 | Beining et al. | 358/247 |
| 4,695,827 A | 9/1987 | Beining et al. | 340/365 P |
| 4,733,222 A | 3/1988 | Evans | 340/365 C |
| 4,734,685 A | 3/1988 | Watanabe | 340/710 |
| 4,746,770 A | 5/1988 | McAvinney | 178/18 |
| 4,771,276 A | 9/1988 | Parks | 340/712 |
| 4,788,384 A | 11/1988 | Bruere-Dawson et al. | 178/18 |
| 4,806,846 A | 2/1989 | Kerber | 324/60 CD |
| 4,898,555 A | 2/1990 | Sampson | 445/22 |
| 4,968,877 A | 11/1990 | McAvinney et al. | 250/221 |
| 5,003,519 A | 3/1991 | Noirjean | 368/73 |
| 5,017,030 A | 5/1991 | Crews | 400/485 |
| 5,178,477 A | 1/1993 | Gambaro | 400/489 |
| 5,189,403 A | 2/1993 | Franz et al. | 340/711 |
| 5,194,862 A | 3/1993 | Edwards | 341/20 |
| 5,224,861 A | 7/1993 | Glass et al. | 434/35 |
| 5,241,308 A | 8/1993 | Young | 341/34 |
| 5,252,951 A | 10/1993 | Tannenbaum | |
| 5,281,966 A | 1/1994 | Walsh | 341/22 |
| 5,305,017 A | 4/1994 | Gerpheide | 345/174 |
| 5,345,543 A | 9/1994 | Capps et al. | |
| 5,376,948 A | 12/1994 | Roberts | 345/173 |
| 5,398,310 A | 3/1995 | Tchao et al. | |
| 5,442,742 A | 8/1995 | Greyson et al. | |
| 5,463,388 A | 10/1995 | Boie et al. | 341/33 |
| 5,463,696 A | 10/1995 | Beernink et al. | |
| 5,483,261 A | 1/1996 | Yasutake | 345/173 |
| 5,488,204 A | 1/1996 | Mead et al. | 178/18 |
| 5,495,077 A | 2/1996 | Miller et al. | 178/18 |
| 5,513,309 A | 4/1996 | Beier et al. | |
| 5,523,775 A | 6/1996 | Capps | |
| 5,530,455 A | 6/1996 | Gillick et al. | 345/163 |
| 5,543,590 A | 8/1996 | Gillespie et al. | 178/18 |
| 5,543,591 A | 8/1996 | Gillespie et al. | |
| 5,563,632 A | 10/1996 | Roberts | 345/173 |
| 5,563,996 A | 10/1996 | Tchao | |
| 5,565,658 A | 10/1996 | Gerpheide et al. | 178/19 |
| 5,579,036 A | 11/1996 | Yates, IV | 345/173 |
| 5,581,681 A | 12/1996 | Tchao et al. | |
| 5,583,946 A | 12/1996 | Gourdol | |
| 5,590,219 A | 12/1996 | Gourdol | |
| 5,592,566 A | 1/1997 | Pagallo et al. | |
| 5,594,810 A | 1/1997 | Gourdol | |
| 5,596,694 A | 1/1997 | Capps | |
| 5,612,719 A | 3/1997 | Beernink et al. | |
| 5,627,567 A * | 5/1997 | Davidson | 345/173 |
| 5,631,805 A | 5/1997 | Bonsall | 361/681 |
| 5,633,955 A | 5/1997 | Bozinovic et al. | |
| 5,634,102 A | 5/1997 | Capps | |
| 5,636,101 A | 6/1997 | Bonsall et al. | 361/681 |
| 5,642,108 A | 6/1997 | Gopher et al. | 341/22 |
| 5,644,657 A | 7/1997 | Capps et al. | |
| 5,666,113 A | 9/1997 | Logan | 341/34 |
| 5,666,502 A | 9/1997 | Capps | |
| 5,666,552 A | 9/1997 | Greyson et al. | |
| 5,675,361 A | 10/1997 | Santilli | 345/168 |
| 5,677,710 A | 10/1997 | Thompson-Rohrlich | |
| 5,689,253 A | 11/1997 | Hargreaves et al. | 341/22 |
| 5,710,844 A | 1/1998 | Capps et al. | |
| 5,729,250 A | 3/1998 | Bishop et al. | 345/175 |
| 5,730,165 A | 3/1998 | Philipp | 137/1 |
| 5,736,976 A | 4/1998 | Cheung | 345/168 |
| 5,740,390 A | 4/1998 | Pickover et al. | 395/348 |
| 5,741,990 A | 4/1998 | Davies | 84/423 R |
| 5,745,116 A | 4/1998 | Pisutha-Arnond | |
| 5,745,716 A | 4/1998 | Tchao et al. | |
| 5,746,818 A | 5/1998 | Yatake | 106/31.86 |
| 5,748,269 A | 5/1998 | Harris et al. | 349/58 |
| 5,748,512 A | 5/1998 | Vargas | |
| 5,757,358 A * | 5/1998 | Osga | 715/862 |
| 5,764,222 A | 6/1998 | Shieh | 345/173 |
| 5,764,818 A | 6/1998 | Capps et al. | |
| 5,767,457 A | 6/1998 | Gerpheide et al. | 178/18 |
| 5,767,842 A | 6/1998 | Korth | 345/168 |
| 5,790,104 A | 8/1998 | Shieh | 345/173 |
| 5,790,107 A | 8/1998 | Kasser et al. | 345/174 |
| 5,798,760 A | 8/1998 | Vayda et al. | |
| 5,802,516 A | 9/1998 | Shwarts et al. | |
| 5,805,165 A * | 9/1998 | Thorne et al. | 715/823 |
| 5,808,567 A | 9/1998 | McCloud | 341/20 |
| 5,809,267 A | 9/1998 | Moran et al. | |
| 5,821,690 A | 10/1998 | Martens et al. | 313/506 |
| 5,821,930 A | 10/1998 | Hansen | 345/340 |
| 5,823,782 A | 10/1998 | Marcus et al. | 434/156 |
| 5,825,308 A | 10/1998 | Rosenberg | |
| 5,825,351 A | 10/1998 | Tam | 345/173 |
| 5,825,352 A | 10/1998 | Bisset et al. | 345/173 |
| 5,854,625 A | 12/1998 | Frisch et al. | 345/173 |
| 5,874,948 A | 2/1999 | Shieh | |
| 5,877,751 A | 3/1999 | Kanemitsu et al. | |
| 5,880,411 A | 3/1999 | Gillespie et al. | 178/18.01 |
| 5,898,434 A | 4/1999 | Small et al. | |
| 5,920,309 A | 7/1999 | Bisset et al. | 345/173 |
| 5,923,319 A | 7/1999 | Bishop et al. | 345/175 |
| 5,933,134 A | 8/1999 | Shieh | 345/173 |
| 5,943,044 A | 8/1999 | Martinelli et al. | 345/174 |
| 5,963,671 A | 10/1999 | Comerford et al. | 382/230 |
| 6,002,389 A | 12/1999 | Kasser | 345/173 |
| 6,002,808 A | 12/1999 | Freeman | |
| 6,020,881 A | 2/2000 | Naughton et al. | 345/327 |
| 6,028,271 A | 2/2000 | Gillespie et al. | |
| 6,031,524 A | 2/2000 | Kunert | 345/173 |
| 6,037,882 A | 3/2000 | Levy | 341/20 |
| 6,049,326 A | 4/2000 | Beyda et al. | 345/157 |
| 6,050,825 A | 4/2000 | Nichol et al. | 434/227 |
| 6,052,339 A | 4/2000 | Frenkel et al. | 368/230 |
| 6,072,494 A | 6/2000 | Nguyen | |
| 6,084,576 A | 7/2000 | Leu et al. | 345/168 |
| 6,104,384 A * | 8/2000 | Moon et al. | 345/168 |
| 6,107,997 A | 8/2000 | Ure | 345/173 |
| 6,128,003 A | 10/2000 | Smith et al. | |
| 6,131,299 A | 10/2000 | Raab et al. | 33/503 |
| 6,135,958 A | 10/2000 | Mikula-Curtis et al. | 600/443 |
| 6,144,380 A | 11/2000 | Shwarts et al. | |
| 6,188,391 B1 | 2/2001 | Seely et al. | 345/173 |
| 6,198,515 B1 | 3/2001 | Cole | 348/836 |
| 6,208,329 B1 | 3/2001 | Ballare | 345/173 |
| 6,222,465 B1 | 4/2001 | Kumar et al. | |
| 6,239,790 B1 | 5/2001 | Martinelli et al. | 345/174 |
| 6,243,071 B1 | 6/2001 | Shwarts et al. | |
| 6,246,862 B1 | 6/2001 | Grivas et al. | 455/90 |
| 6,249,606 B1 | 6/2001 | Kiraly et al. | |
| 6,259,436 B1 * | 7/2001 | Moon et al. | 345/173 |
| 6,278,443 B1 | 8/2001 | Amro et al. | 345/173 |
| 6,288,707 B1 | 9/2001 | Philipp | 345/168 |
| 6,289,326 B1 | 9/2001 | LaFleur | 705/702 |
| 6,292,178 B1 | 9/2001 | Bernstein et al. | 345/173 |
| 6,323,846 B1 | 11/2001 | Westerman et al. | |
| 6,347,290 B1 | 2/2002 | Bartlett | |
| 6,377,009 B1 | 4/2002 | Philipp | 318/468 |
| 6,380,931 B1 | 4/2002 | Gillespie et al. | |
| 6,411,283 B1 | 6/2002 | Murphy | 345/173 |
| 6,411,287 B1 | 6/2002 | Scharff et al. | 345/177 |
| 6,414,671 B1 | 7/2002 | Gillespie et al. | |
| 6,421,234 B1 | 7/2002 | Ricks et al. | 361/683 |
| 6,452,514 B1 | 9/2002 | Philipp | 341/33 |
| 6,457,355 B1 | 10/2002 | Philipp | 73/304 |
| 6,466,036 B1 | 10/2002 | Philipp | 324/678 |
| 6,515,669 B1 | 2/2003 | Mohri | 345/474 |
| 6,525,749 B1 | 2/2003 | Moran et al. | 345/863 |
| 6,535,200 B2 | 3/2003 | Philipp | 345/168 |
| 6,543,684 B1 | 4/2003 | White et al. | 234/379 |
| 6,543,947 B2 | 4/2003 | Lee | 400/489 |
| 6,567,109 B1 * | 5/2003 | Todd | 715/862 |

| | | |
|---|---|---|
| 6,570,557 B1 | 5/2003 | Westerman et al. |
| 6,593,916 B1 | 7/2003 | Aroyan ............... 345/173 |
| 6,610,936 B2 | 8/2003 | Gillespie et al. |
| 6,624,833 B1 | 9/2003 | Kumar et al. |
| 6,639,577 B2 | 10/2003 | Eberhard ............... 345/102 |
| 6,643,824 B1 | 11/2003 | Bates et al. ............ 715/501.1 |
| 6,650,319 B1 | 11/2003 | Hurst et al. ............ 345/173 |
| 6,658,994 B1 | 12/2003 | McMillan ............... 99/468 |
| 6,670,894 B2 | 12/2003 | Mehring ............... 341/22 |
| 6,677,932 B1* | 1/2004 | Westerman ............ 345/173 |
| 6,677,934 B1 | 1/2004 | Blanchard ............... 345/173 |
| 6,724,366 B2 | 4/2004 | Crawford ............... 345/157 |
| 6,757,002 B1 | 6/2004 | Oross et al. ............ 345/864 |
| 6,803,906 B1 | 10/2004 | Morrison et al. ............ 345/173 |
| 6,842,672 B1 | 1/2005 | Straub et al. ............ 701/3 |
| 6,856,259 B1 | 2/2005 | Sharp ............... 341/5 |
| 6,888,536 B2 | 5/2005 | Westerman et al. |
| 6,900,795 B1 | 5/2005 | Knight, III et al. ........ 345/173 |
| 6,927,761 B2 | 8/2005 | Badaye et al. ............ 345/173 |
| 6,938,220 B1 | 8/2005 | Shigematsu et al. ........ 715/863 |
| 6,942,571 B1 | 9/2005 | McAllister et al. ............ 463/20 |
| 6,965,375 B1 | 11/2005 | Gettemy et al. ............ 345/173 |
| 6,972,401 B2 | 12/2005 | Akitt et al. ............ 250/221 |
| 6,977,666 B1 | 12/2005 | Hedrick ............... 345/690 |
| 6,985,801 B1 | 1/2006 | Straub et al. ............ 701/3 |
| 6,992,659 B2 | 1/2006 | Gettemy ............... 345/173 |
| 7,031,228 B2 | 4/2006 | Born et al. ............ 368/69 |
| 7,277,088 B2 | 10/2007 | Robinson et al. ............ 345/173 |
| 7,352,365 B2 | 4/2008 | Trachte ............... 345/173 |
| 7,489,306 B2 | 2/2009 | Kolmykov-Zotov et al. . 345/173 |
| 7,605,804 B2 | 10/2009 | Wilson ............... 345/173 |
| 2002/0051018 A1 | 5/2002 | Yeh ............... 345/784 |
| 2002/0118848 A1 | 8/2002 | Karpenstein ............... 381/119 |
| 2003/0006974 A1 | 1/2003 | Clough et al. ............ 345/179 |
| 2003/0063073 A1 | 4/2003 | Geaghan et al. ............ 345/173 |
| 2003/0076301 A1 | 4/2003 | Tsuk et al. ............ 345/159 |
| 2003/0076303 A1 | 4/2003 | Huppi ............... 345/163 |
| 2003/0076306 A1 | 4/2003 | Zadesky et al. ............ 345/173 |
| 2003/0095095 A1 | 5/2003 | Pihlaja ............... 345/156 |
| 2003/0095096 A1 | 5/2003 | Robbin et al. ............ 345/156 |
| 2003/0098858 A1 | 5/2003 | Perski et al. ............ 345/173 |
| 2003/0193481 A1 | 10/2003 | Sokolsky |
| 2003/0206202 A1 | 11/2003 | Moriya ............... 345/846 |
| 2003/0234768 A1 | 12/2003 | Rekimoto et al. ............ 345/169 |
| 2004/0021644 A1 | 2/2004 | Enomoto |
| 2004/0053661 A1 | 3/2004 | Jones et al. |
| 2004/0134238 A1 | 7/2004 | Buckroyd et al. |
| 2004/0136564 A1 | 7/2004 | Roeber et al. |
| 2004/0155869 A1* | 8/2004 | Robinson et al. ............ 345/168 |
| 2004/0183833 A1* | 9/2004 | Chua ............... 345/773 |
| 2004/0263484 A1 | 12/2004 | Montysalo et al. ......... 345/173 |
| 2005/0012723 A1 | 1/2005 | Pallakoff ............... 345/173 |
| 2005/0027622 A1* | 2/2005 | Walker et al. ............ 705/28 |
| 2005/0052425 A1 | 3/2005 | Zadesky et al. ............ 345/173 |
| 2005/0104867 A1 | 5/2005 | Westerman et al. ............ 345/173 |
| 2005/0110768 A1 | 5/2005 | Marriott et al. ............ 345/173 |
| 2005/0116927 A1* | 6/2005 | Voelckers ............... 345/157 |
| 2005/0134578 A1 | 6/2005 | Chambers et al. |
| 2005/0190970 A1 | 9/2005 | Griffin ............... 382/209 |
| 2006/0007174 A1 | 1/2006 | Shen ............... 345/173 |
| 2006/0022955 A1 | 2/2006 | Kennedy ............... 345/173 |
| 2006/0022956 A1 | 2/2006 | Lengeling et al. ............ 345/173 |
| 2006/0026521 A1 | 2/2006 | Hotelling et al. ............ 715/702 |
| 2006/0026535 A1 | 2/2006 | Hotelling et al. ............ 715/863 |
| 2006/0026536 A1 | 2/2006 | Hotelling et al. ............ 715/863 |
| 2006/0032680 A1 | 2/2006 | Elias et al. ............ 178/18.06 |
| 2006/0033724 A1 | 2/2006 | Chaudhri et al. ............ 345/173 |
| 2006/0053387 A1 | 3/2006 | Ording ............... 715/773 |
| 2006/0066582 A1 | 3/2006 | Lyon et al. ............ 345/173 |
| 2006/0085757 A1 | 4/2006 | Andre et al. ............ 715/771 |
| 2006/0097991 A1 | 5/2006 | Hotelling et al. ............ 345/173 |
| 2006/0197753 A1 | 9/2006 | Hotelling ............... 345/173 |
| 2009/0284471 A1* | 11/2009 | Longe et al. ............ 345/168 |

FOREIGN PATENT DOCUMENTS

| | | |
|---|---|---|
| DE | 100 42 300 A1 | 3/2002 |
| DE | 100 59 906 A1 | 6/2002 |
| DE | 101 40 874 A1 | 3/2003 |
| DE | 102 51 296 | 5/2004 |
| EP | 0 288 692 | 7/1993 |
| EP | 0 664 504 | 1/1995 |
| EP | 0 464 908 | 9/1996 |
| EP | 1 014 295 | 1/2002 |
| EP | 1 271 295 A2 | 1/2003 |
| EP | 1 569 079 A1 | 8/2005 |
| EP | 1505484 A1 | 9/2005 |
| EP | 1 674 976 A2 | 6/2006 |
| GB | 2344894 A | 6/2000 |
| GB | 2 351 639 A | 1/2001 |
| JP | 10039748 | 2/1998 |
| JP | 2000163193 | 6/2006 |
| KR | 4057131 A | 7/2004 |
| WO | 97/18547 | 5/1997 |
| WO | 97/23738 | 7/1997 |
| WO | 98/14863 | 4/1998 |
| WO | WO 98/14863 | 4/1998 |
| WO | 99/28813 A1 | 6/1999 |
| WO | 99/38149 A1 | 7/1999 |
| WO | 99/54807 A1 | 10/1999 |
| WO | 00/38042 A1 | 6/2000 |
| WO | WO 00/38042 | 6/2000 |
| WO | 01/02949 A1 | 1/2001 |
| WO | 02/01482 A1 | 1/2002 |
| WO | 03/088176 | 10/2003 |
| WO | 03/098421 A1 | 11/2003 |
| WO | 2005/114369 A2 | 12/2005 |
| WO | 2006/023569 | 3/2006 |
| WO | 2006/026012 A2 | 3/2006 |

OTHER PUBLICATIONS

U.S. Appl. No. 10/903,964, filed Jul. 30, 2004.
U.S. Appl. No. 10/927,925, filed Aug. 26, 2004.
U.S. Appl. No. 11/048,264, filed Jan. 31, 2005.
"Touch Technologies Overview." 3M Touch Systems, Massachusetts 2001.
Hardy, Ian. "Fingerworks." Mar. 7, 2002.
"Symbol Commander" (printed Aug. 30, 2005) http://www.sensiva.com/symbolcommander.
"Mouse Gestures in Opera" (printed Apr. 20, 2004) http://www.opera.com.features/mouse/.
"A Brief Overview of Gesture Recognition" (printed Apr. 20, 2004) http://www.dai.ed.ac.uk/Cvonline/LOCAL_COPIES/COHEN/gesture_overview.html.
Rekimoto, Jun. "SmartSkin: An Infrastructure for Freehand Manipulation on Interactive Surfaces." CHI 2002. Apr. 20-25, 2002.
"Mouse Gestures." Optim oz. May 21, 2004.
"iGesture Products for Everyone (Learn in Minutes)." FingerWorks. Aug. 30, 2005.
"MultiTouch Overview." FingerWorks. (printed Aug. 30, 2005) http://www.fingerworks.com/multoveriew.html.
"Gesture Recognition." (printed Aug. 30, 2005) http://www.fingerworks.com/gesture_recognition.html.
"Tips for Typing." FingerWorks. (printed Aug. 30, 2005) http://www.fingerworks.com/mini_typing.html.
"Mouse Emulation." FingerWorks. (printed Aug. 30, 2005).
"Touch Technologies: Touch is Everywhere." (printed Aug. 30, 2005) http://www.3m.com/3MTouchSystems/downloads/PDFs/TouchTechOV.pdf.
U.S. Appl. No. 10/654,108, filed Sep. 2, 2003 entitled "Ambidextrous Mouse".
U.S. Appl. No. 10/789,676, filed Feb. 27, 2004 entitled "Shape Detecting Input Device".

"4-Wire Resistive Touchscreens" obtained from http://www.touchscreens.com/intro-touchtypes-4resistive.html generated Aug. 5, 2005.

"5-Wire Resistive Touchscreens" obtained from http://www.touchscreens.com/intro-touchtypes-resistive.html generated Aug. 5, 2005.

"A Brief Overview of Gesture Recognition" obtained from http://www.dai.ed.ac.uk/Cvonline/LOCA_COPIES/COHEN/gesture_overview.html, generated Apr. 20, 2004.

"Capacitive Touchscreens" obtained from http://www.touchscreens.com/intro-touchtypes-capacitive.html generated Aug. 5, 2005.

"Capacitive Position Sensing" obtained from http://www.synaptics.com/technology/cps.cfm generated Aug. 5, 2005.

"Comparing Touch Technologies" obtained from http://www.touchscreens.com/intro-touchtypes.html generated Oct. 10, 2004.

"Gesture Recognition" http://www.fingerworks.com/gesture_recognition.html.

"GlidePoint®" obtained from http://www.cirque.com/technology/technology_gp.html generated Aug. 5, 2005.

"How do touchscreen monitors know where you're touching?" obtained from http://www.electronics.howstuffworks.com/question716.html generated Aug. 5, 2005.

"How does a touchscreen work?" obtained from http://www.touchscreens.com/intro-anatomy.html generated Aug. 5, 2005.

"iGesture Products for Everyone (learn in minutes) Product Overview" FingerWorks.com.

"Infrared Touchscreens" obtained from http://www.touchscreens.com/intro-touchtypes-infrared.html generated Aug. 5, 2005.

"Mouse Emulation" FingerWorks obtained from http://www.fingerworks.com/gesture_guide_mouse.html generated Aug. 30, 2005.

"Mouse Gestures in Opera" obtained from http://www.opera.com/products/desktop/mouse/index.dml generated Aug. 30, 2005.

"Mouse Gestures," Optim oz, May 21, 2004.

"MultiTouch Overview" FingerWorks obtained from http://www.fingerworks.com/multoverview.html generated Aug. 30, 2005.

"Near Field Imaging Touchscreens" obtained from http://www.touchscreens.com/intro-touchtypes-nfi.html generated Aug. 5, 2005.

"PenTouch Capacitive Touchscreens" obtained from http://www.touchscreens.com/intro-touchtypes-pentouch.html generated Aug. 5, 2005.

"Surface Acoustic Wave Touchscreens" obtained from http://www.touchscreens.com/intro-touchtypes-saw.html generated Aug. 5, 2005.

"Symbol Commander" obtained from http://www.sensiva.com/symbolcomander/, generated Aug. 30, 2005.

"Tips for Typing" FingerWorks http://www.fingerworks.com/mini_typing.html generated Aug. 30, 2005.

"Touch Technologies Overview" 2001, 3M Touch Systems, Massachusetts.

"Wacom Components—Technology" obtained from http://www.wacom-components.com/english/tech.asp generated on Oct. 10, 2004.

"Watershed Algorithm" http://rsb.info.nih.gov/ij/plugins/watershed.html generated Aug. 5, 2005.

"FingerWorks—Gesture Guide—Application Switching," obtained from http://www.fingerworks.com/gesture_guide_apps.html, generated on Aug. 27, 2004, 1-pg.

"FingerWorks—Gesture Guide—Editing," obtained from http://www.fingerworks.com/gesure_guide_editing.html, generated on Aug. 27, 2004, 1-pg.

"FingerWorks—Gesture Guide—File Operations," obtained from http://www.fingerworks.com/gesture_guide_files.html, generated on Aug. 27, 2004, 1-pg.

"FingerWorks—Gesture Guide—Text Manipulation," obtained from http://www.fingerworks.com/gesture_guide_text_manip.html, generated on Aug. 27, 2004, 2-pg.

"FingerWorks—Gesture Guide—Tips and Tricks," obtained from http://www.fingerworks.com/gesture_guide_tips.html, generated Aug. 27, 2004, 2-pgs.

"FingerWorks—Gesture Guide—Web," obtained from http://www.fingerworks.com/gesture_guide_web.html, generated on Aug. 27, 2004, 1-pg.

"FingerWorks—Guide to Hand Gestures for USB Touchpads," obtained from http://www.fingerworks.com/igesture_userguide.html, generated Aug. 27, 2004, 1-pg.

"FingerWorks—iGesture—Technical Details," obtained from http://www.fingerworks.com/igesture_tech.html, generated Aug. 27, 2004, 1-pg.

"FingerWorks—The Only Touchpads with Ergonomic Full-Hand Resting and Relaxation!" obtained from http://www.fingerworks.com/resting.html, Copyright 2001, 1-pg.

"FingerWorks—Tips for Typing on the Mini," obtained from http://www.fingerworks.com/mini_typing.html, generated on Aug. 27, 2004, 2-pgs.

"iGesture Pad—The MultiFinger USB TouchPad with Whole-Hand Gestures," obtained from http://www.fingerworks.com/igesture.html, generated Aug. 27, 2004, 2-pgs.

Bier, et al., "Toolglass and Magic Lenses: The see-through interface" In James Kijiya, editor, Computer Graphics (SIGGRAPH '93 Proceedings), vol. 27, pp. 73-80, Aug. 1993.

Douglas et al., *The Ergonomics of Computer Pointing Devices* (1997).

European Search Report in EP 1 621 989 (@ Beyer Weaver & Thomas, LLP) dated Mar. 27, 2006.

EVB Elektronik "TSOP6238 IR Receiver Modules for Infrared Remote Control Systems" dated Jan. 2004 1-pg.

Fisher et al., "Repetitive Motion Disorders: The Design of Optimal Rate- Rest Profiles," Human Factors, 35(2):283-304 (Jun. 1993).

Fukumoto, et al., "ActiveClick: Tactile Feedback for Touch Panels," In CHI 2001 Summary, pp. 121-122, 2001.

Fukumoto and Yoshinobu Tonomura, "Body Coupled Fingering: Wireless Wearable Keyboard," *CHI 97*, pp. 147-154 (Mar. 1997).

Hardy, "Fingerworks" Mar. 7, 2002; BBC World On Line.

Hillier and Gerald J. Lieberman, *Introduction to Operations Research* (1986).

International Search Report dated Mar. 3, 2006 (PCT/US 05/03325; 119-0052WO).

Jacob et al., "Integrality and Separability of Input Devices," *ACM Transactions on Computer-Human Interaction*, 1:3-26 (Mar. 1994).

Kinkley et al., "Touch-Sensing Input Devices," in CHI '99 Proceedings, pp. 223-230, 1999.

Kionx "KXP84 Series Summary Data Sheet" copyright 2005,dated Oct. 21, 2005, 4-pgs.

Lee et al., "A Multi-Touch Three Dimensional Touch-Sensitive Tablet," in CHI '85 Proceedings, pp. 121-128, 2000.

Lee, "A Fast Multiple-Touch-Sensitive Input Device," Master's Thesis, University of Toronto (1984).

Matsushita et al., "HoloWall: Designing a Finger, Hand, Body and Object Sensitive Wall," In Proceedings of UIST '97, Oct. 1997.

Quantum Research Group "QT510 / QWheel™ Touch Slider IC" copyright 2004-2005, 14-pgs.

Quek, "Unencumbered Gestural Interaction," *IEEE Multimedia*, 3:36-47 (Winter 1996).

Radwin, "Activation Force and Travel Effects on Overexertion in Repetitive Key Tapping," *Human Factors*, 39(1):130-140 (Mar. 1997).

Rekimoto "SmartSkin: An Infrastructure for Freehand Manipulation on Interactive Surfaces" CHI 2002, Apr. 20-25, 2002.

Rekimoto et al., "ToolStone: Effective Use of the Physical Manipulation Vocabularies of Input Devices," In Proc. of UIST 2000, 2000.

Rubine et al., "Programmable Finger-Tracking Instrument Controllers," *Computer Music Journal*, vol. 14, No. 1 (Spring 1990).

Rutledge et al., "Force-To-Motion Functions for Pointing," Human-Computer Interaction—INTERACT (1990).

Subatai Ahmad, "A Usable Real-Time 3D Hand Tracker," Proceedings of the 28th Asilomar Conference on Signals, Systems and Computers—Part 2 (of2), vol. 2 (Oct. 1994).

Texas Instruments "TSC2003 / I2C Touch Screen Controller" Data Sheet SBAS 162, dated Oct. 2001, 20-pgs.

Wellner, "The Digital Desk Calculators: Tangible Manipulation on a Desk Top Display" in ACM UIST '91 Proceedings, pp. 27-34, Nov. 1991.

Williams, "Applications for a Switched-Capacitor Instrumentation Building Block" Linear Technology Application Note 3, Jul. 1985, pp. 1-16.

Yamada et al., "A Switched-Capacitor Interface for Capacitive Pressure Sensors" IEEE Transactions on Instrumentation and Measurement, vol. 41, No. 1, Feb. 1992, pp. 81-86.

Yeh et al., "Switched Capacitor Interface Circuit for Capacitive Transducers" 1985 IEEE.

Zhai et al., "Dual Stream Input for Pointing and Scrolling," *Proceedings of CHI '97 Extended Abstracts* (1997).

Zimmerman et al., "Applying Electric Field Sensing to Human-Computer Interfaces," In CHI '85 Proceedings, pp. 280-287, 1995.

U.S. Appl. No. 10/774,053, filed Feb. 5, 2004.

U.S. Appl. No. 11/140,529, filed May 27, 2005 which is a Reissue of 6,570,557.

U.S. Appl. No. 11/381,313, filed May 2, 2006 entitled "Multipoint Touch Surface Controller".

U.S. Appl. No. 11/332,861, filed Jan. 13, 2006 which is a Reissue of 6,677,932.

U.S. Appl. No. 11/380,109, filed Apr. 25, 2006 entitled "Keystroke Tactility Arrangement on Smooth Touch Surface."

U.S. Appl. No. 11/428,501, filed Jul. 3, 2006 entitled "Capacitive Sensing Arrangement," which is a Continuation of US 2005/0104867.

U.S. Appl. No. 11/428,503, filed Jul. 3, 2006 entitled "Touch Surface" which is a Continuation of US 2005/0104867.

U.S. Appl. No. 11/428,506, filed Jul. 3, 2006 entitled "User Interface Gestures" which is a Continuation of US 2005/0104867.

U.S. Appl. No. 11/428,515, filed Jul. 3, 2006 entitled "User Interface Gestures" which is a Continuation of US 2005/0104867.

U.S. Appl. No. 11/428,522, filed Jul. 3, 2006 entitled "Identifying Contacts on a Touch Surface" which is a Continuation of US 2005/0104867.

U.S. Appl. No. 11/428,521, filed Jul. 3, 2006 entitled "Identifying Contacts on a Touch Surface" which is a Continuation of US 2005/0104867.

U.S. Appl. No. 11/426,078, filed Jun. 23, 2006 entitled "Electronic Device Having Display and Surrounding Touch Sensitive Bezel for User Interface and Control" which is a Continuation-In-Part of 2006/0197753.

U.S. Appl. No. 11/278,080, filed Mar. 30, 2006 entitled "Force Imaging Input Device and System".

U.S. Appl. No. 11/382,402, filed May 9, 2006 entitled "Force and Location Sensitive Display" which is a Continuation of 11/278,080.

International Search Report in corresponding PCT application No. PCT/US2006/008349.

Annex to Form PCT/ISA/206 Communication Relating to the Results of the Partial International Search in corresponding PCT Application No. PCT/US2005/025641 dated Feb. 19, 2007.

PCT International Search Report in corresponding PCT Application No. PCT/US2006/031523 dated Feb. 27, 2007.

PCT International Search Report in corresponding PCT Application No. PCT/US2005/025657 dated Feb. 26, 2007.

PCT International Search Report in corresponding PCT Application No. PCT/US2006/031527 dated Feb. 27, 2007.

PCT International Search Report in corresponding PCT Application No. PCT/US2006/031526 dated Feb. 14, 2007.

Schiphorst, et al.; "Using a Gestural Interface Toolkit for Tactile Input to a Dynamic Virtual Space;" Conference on Human Factors in Computing Systems, Proceedings, Apr. 25, 2002, pp. 754-755.

Chen, et al.; "Flowfield and Beyond: Applying Pressure-Sensitive Multi-Point Touchpad Interaction;" Multimedia and Expo, 2003, ICME '03, Proceedings, Jul. 9, 2003, pp. I-49-I52.

Jones; "MTC Express Multi-touch Controller," Computer Music Journal 25.1, 2001, pp. 97-99.

Centroid, http://faculty,evansville.edu/ck6/tcenters/class/centroid.html, printed Apr. 28, 2006, 4 pages.

International Search Report and Written Opinion for International Application No. PCT/US2008/050426, mailed Jun. 13, 2008.

International Search Report and Written Opinion for International Application No. PCT/US2007/077645, mailed Jan. 10, 2008.

Office Action dated Oct. 14, 2008, in the European Patent Application which corresponds to U.S. Appl. No. 11/228,737.

Office Action dated Sep. 8, 2009 in Australian Patent Application No. 2006291338, which corresponds to U.S. Appl. No. 11/228,737.

Office Action dated Dec. 7, 2009, in European Patent Application No. 08 727 399.1, which corresponds to U.S. Appl. No. 11/969,796.

Office Action dated Dec. 11, 2009, in U.S. Appl. No. 11/696,703.

Office Action dated Jun. 7, 2010, in U.S. Appl. No. 11/850,015.

Office Action dated Feb. 18, 2010, in Australian Patent Application No. 2007292384, which corresponds to U.S. Appl. No. 11/850,015.

Office Action dated Feb. 16, 2010, in European Patent Application No. 07 814 691.7, which corresponds to U.S. Appl. No. 11/850,015.

\* cited by examiner

$d_q$ is Shortest

ACTIVATING VIRTUAL KEYS OF A TOUCH-SCREEN VIRTUAL KEYBOARD

CROSS-REFERENCE TO RELATED APPLICATIONS

This application is a Continuation-In-Part of prior application Ser. No.: 10/903,964 filed Jul. 30, 2004, from which priority under 35 U.S.C. §120 is claimed, which is hereby incorporated by reference in its entirety. This application is also related to the following co-pending applications: U.S. Ser. No.: 10/840,862, filed May 6, 2004; U.S. Ser. No.: 11/048,264, filed Jul. 30, 2004; U.S. Ser. No.: 11/038,590, filed Jul. 30, 2004; U.S. Ser. No.: 11/228,758, filed Sep. 16, 2005; and U.S. Ser. No.: 11/228,700, filed Aug. 16, 2005; all of which are hereby incorporated herein by reference in their entirety for all purposes.

TECHNICAL FIELD

The present invention is in the field of touch screens and, in particular, relates to operating a touch screen to activate one of a plurality of virtual keys.

BACKGROUND

A touch screen is a type of display screen that has a touch-sensitive transparent panel covering the screen. When using a touch screen, a user makes a selection on the display screen by pointing directly to GUI objects on the screen (usually with a stylus or finger). The GUI objects may be considered as virtual keys (for example, of a keyboard). It is desirable to increase the usability of display screens for activating virtual keys.

SUMMARY

In accordance with one aspect, a method of operating a touch screen to activate one of a plurality of virtual graphical user interface (GUI) items is provided. A touch location is determined based on location data pertaining to touch input on the touch screen, wherein the touch input is intended to activate one of the plurality of virtual GUI items. Each of the plurality of virtual GUI items has a set of at least one item location corresponding to it. For each of the virtual GUI items, a parameter (such as physical distance) is determined for that virtual GUI item that relates the touch location and the set of at least one item location corresponding to that virtual GUI item. The determined parameters are processed to determine one of the virtual GUI items. For example, the determined one virtual GUI item may be the virtual GUI item with an item location (or more than one item location, on average) being closest to the touch location. A signal is generated indicating activation of the determined one of the virtual GUI items.

In accordance with another aspect, a method of operating a touch screen to activate one of a plurality of virtual keys is provided. Thus, for example, the virtual keys may be considered specific examples of virtual GUI items. A touch location is determined based on location data pertaining to touch input on the touch screen, wherein the touch input is intended to activate one of the plurality of virtual keys. Each of the plurality of virtual keys has a set of at least one key location corresponding to it. For each of the virtual keys, a parameter (such as physical distance) is determined for that virtual key that relates the touch location and the set of at least one key location corresponding to that virtual key. The determined parameters are processed to determine one of the virtual keys. For example, the determined one virtual key may be the virtual key with a key location (or more than one key location, on average) being closest to the touch location. A signal is generated indicating activation of the determined one of the virtual keys.

Weights may be associated with each key location, and the weights may be adjusted dynamically based on a sequence of virtual keys previously activated and, in some examples, also based on external considerations such as statistical probabilities of particular virtual keys being activated (based, for example, on dictionaries or letter occurrence frequency data).

In one example, a dictionary lookup is used, and all of the letters of a word are considered in doing the dictionary lookup. In other examples, an "x" (e.g., 4) letter rolling window is considered. Thus, for a word that is (or is, thus far) less than or equal to "x" letters, the entire word is used in the dictionary lookup. Once the "x" letter window is full, only the "x" letters are considered. This can reduce the amount of processing relative to considering greater than "x" letters. In addition, a hybrid approach may be used. For example, a dictionary lookup may be used (perhaps with a relatively small dictionary) initially and, if the word is not in the dictionary, then the letters of the rolling window is considered. In some examples, the positioning of the letters in the words (particularly, but not limited to, at the beginning of a word) is considered. In one example, this is accomplished by considering "space" as the first letter of a word. Furthermore, in some examples, the frequency of occurrence of a word (e.g., within a particular document) may be used as input for adjusting the weights.

Thus, the usability of touch screen virtual keyboards is enhanced.

BRIEF DESCRIPTION OF FIGURES

FIGS. 1-1A through 1-1C illustrate a typical mismatch between the touch area of a user's finger, to activate a GUI item on a touch screen, and a visual target associated with that GUI item.

DETAILED DESCRIPTION

We now describe a method of operating a touch screen to activate one of a plurality of virtual keys. The touch screen is an input device of a computing system which, for example, operates under program control (where the program is stored as instructions in a memory, for example) based at least in part on user input. The computing system may be, for example, a personal computer, a computing system embedded within an electronic device (such as, for example, a cellular telephone, media player or other consumer electronic device.) In operation, a user interacts with the touch screen and, in response, the touch screen (and or hardware/software associated with the touch screen) provides location data pertaining to touch input on the touch screen.

Figure 9:
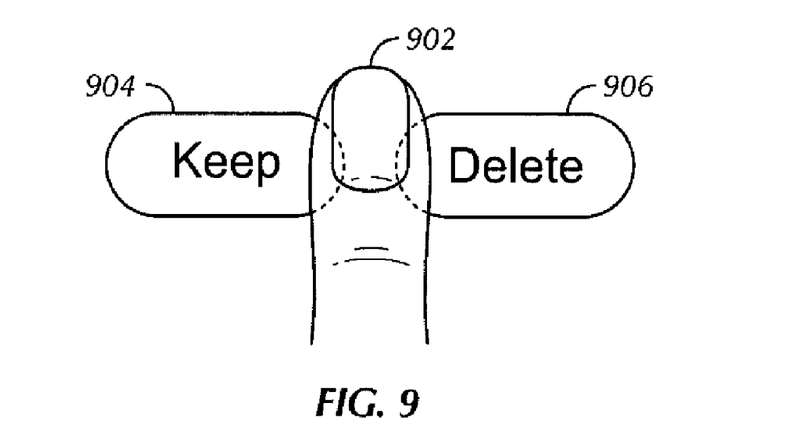
FIG. 9 illustrates an example of virtual GUI items on a touch screen display where, in this example, the virtual GUI items are not virtual keys of a keyboard.

The touch screen provides a graphical user interface that includes GUI items that can be activated by the user as input to the program operating on the computer system. As can be seen from FIGS. 1-1A, 1-1B and 1-1C, the touch area of a user's finger, to activate a GUI item on a touch screen, typically does not match a visual target associated with that GUI item. FIG. 1-1A shows a finger 12 approaching the touch-sensitive layer 14 of the touch screen. FIG. 1-1A also shows a visual target 10 displayed on the screen 16 of the touch screen. FIG. 1-1B shows the finger 12 touching the touch sensitive layer 14. It can be seen from FIG. 1-1B that the finger 12 contacts the touch sensitive layer 14 at a touch area 18. The mid-point 20 of the touch area 18 does not match the visual target 10 displayed on the screen 16 of the touch screen. FIG. 1-1C shows a plan view of the finger 12, visual target 10 and mid-point 20 of the touch area 18. FIG. 9 illustrates, in plan view, a situation where a finger 902 is being used to potentially activate two somewhat small GUI items, a keep GUI item 904 and a delete GUI item 906.

It is desirable to process touches on a touch screen in a way that does not necessarily depend on a match between the visual target 10 and a touch area of a touch to activate a GUI to which the visual target 10 corresponds. It is desirable to process touches on a touch screen in a way that "makes sense," which may include considering factors beyond (or instead of) a correspondence of the visual target and the touch area of a touch to activate the GUI to which the visual target corresponds.

Figure 1:
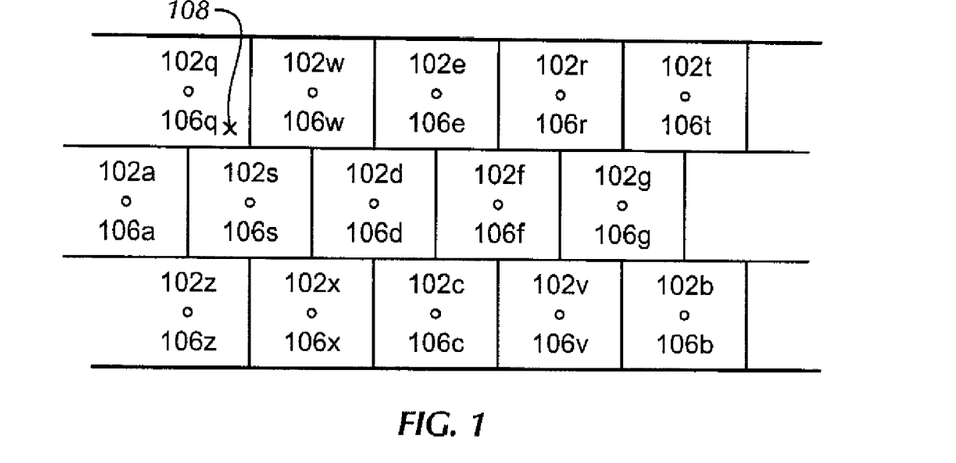
FIG. 1 illustrates a keyboard GUI (having multiple keys) displayed on a touch screen, where each dot (not displayed on the touch screen) indicates a key location corresponding to a separate virtual key (which typically are not, but may be, coincident with the each displayed key of the keyboard GUI).
Figures 1, 1A:
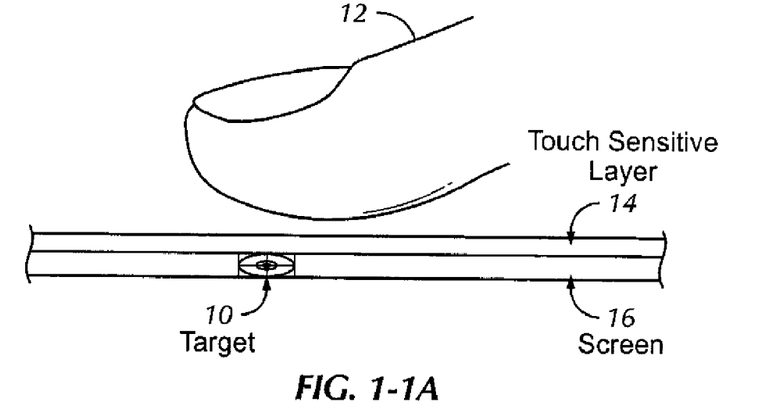
Figures 1, 1B:
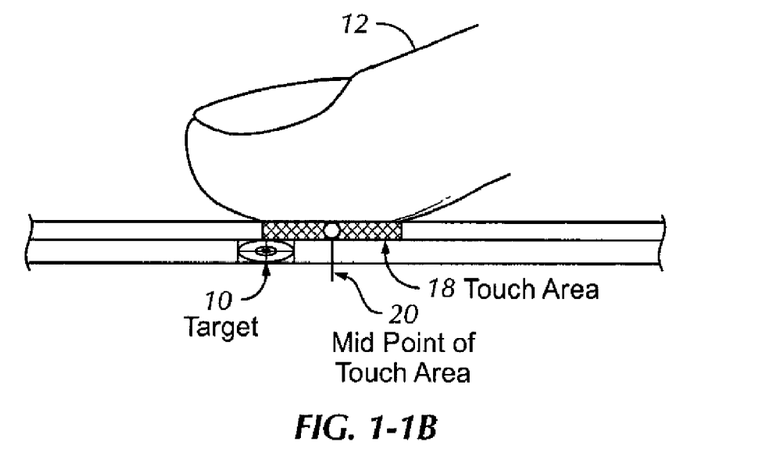
Figures 1, 1C:
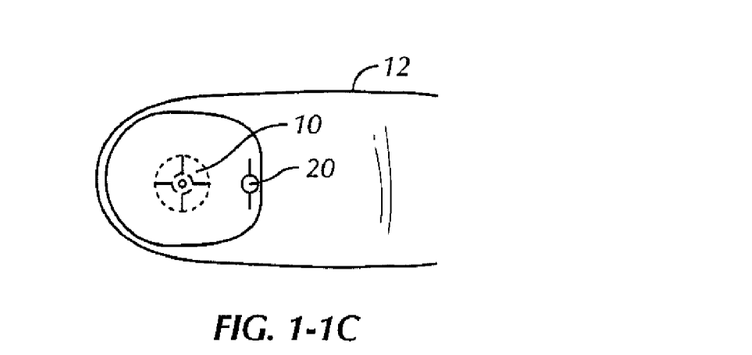

In one example, the GUI items are virtual keys of a virtual keyboard. The GUI items are not limited to being virtual keys of a virtual keyboard, however. FIG. 1 illustrates a portion of a touch screen, where the gridlines 104 are displayed to the user, visually defining "keys" that are present on a conventional qwerty keyboard. The shapes and locations of the visually-defined keys need not be operationally correlated to the shapes of the virtual keys. This will be seen later, particularly with reference to FIG. 7. The visually-defined keys are labeled in FIG. 1 as $102q$, $102w$, $102e$, etc., to indicate the letter to which each key corresponds on a conventional qwerty keyboard.

Each of the plurality of virtual keys has a set of at least one key location corresponding to it. The dots $106q$, $106w$, $106e$, etc indicate key locations. In the FIG. 1 example, each set of key locations (corresponding to a separate virtual key) is a set of one key location. Later, sets of key locations are illustrated that include more than one key location.

In FIG. 1, a touch location is denoted by the "X" 108. In accordance with a broad aspect, a parameter is determined for each virtual key that relates the touch location to the set of at least one key location corresponding to that virtual key. The determined parameters are processed to determine one of the virtual keys, and a signal is generated indicating activation of the determined one of the virtual keys.

Figure 2:
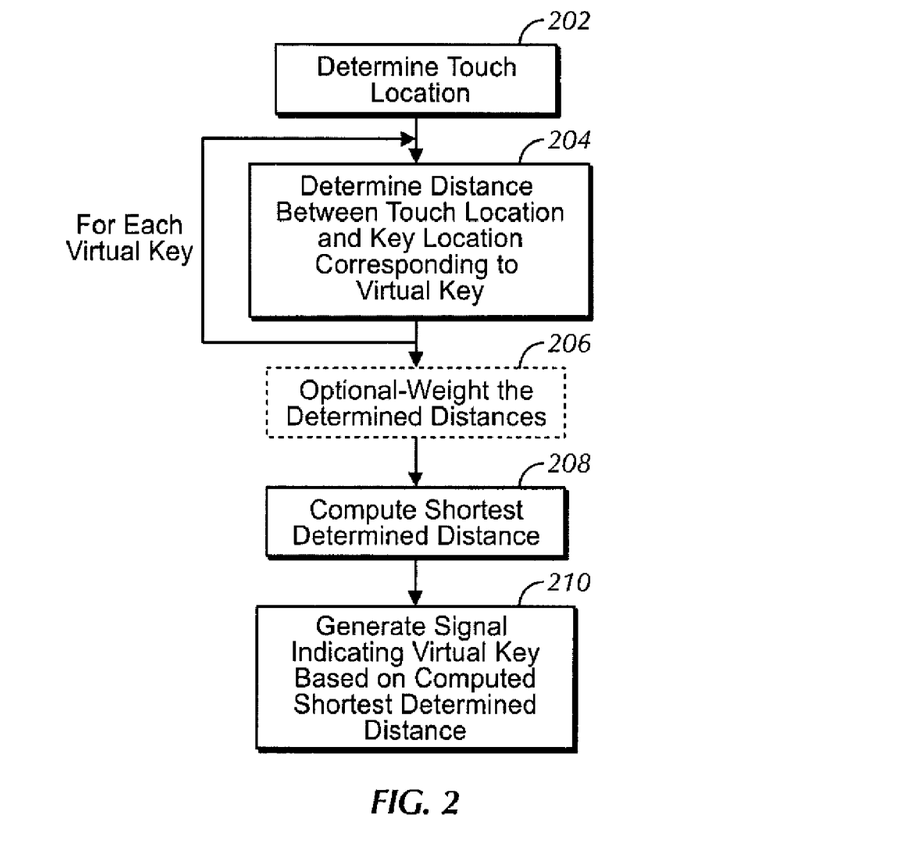
FIG. 2 is a flowchart illustrating one example method to determine which virtual key a user has activated.

We now reference FIG. 2, which is a flowchart illustrating a particular example of a virtual key activation method. For simplicity of illustration, we initially describe a situation like in FIG. 1 where each set of key locations is a set of one key location. At step 202, the touch location is determined, based on location data pertaining to touch input on the touch screen. The location data may be provided, for example, by low level program code being executed by a processor associated with the touch screen. Referring to the FIG. 1 example, the touch location is denoted by the "X" 108.

At step 204, for each virtual key, a distance is determined between the touch location "X" 108 and the key location 106 (generically) corresponding to that virtual key. Step 206 is a step included in some examples, and step 206 is discussed later. At step 208, it is determined to which of the virtual keys the shortest distance determined in step 204 corresponds. At step 210, a signal is generated to indicate activation of the virtual key determined in step 208.

Figure 3:
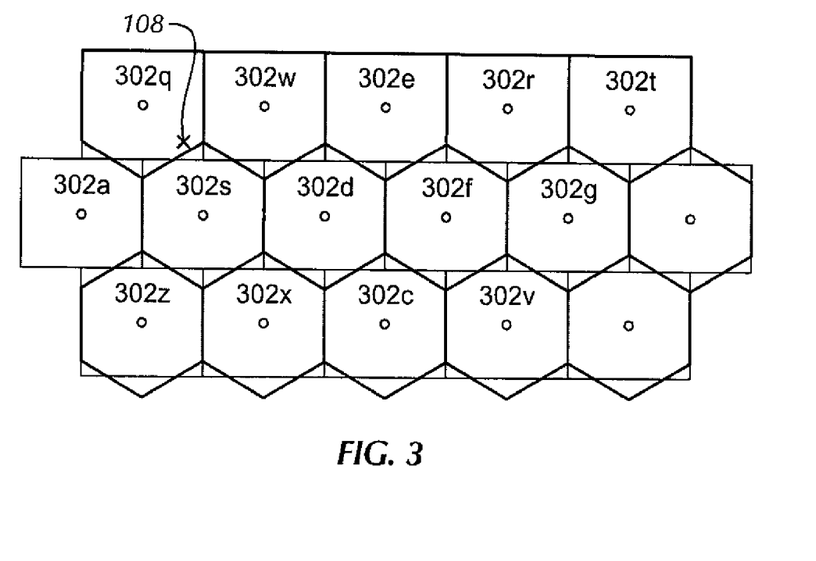
FIG. 3 illustrates the shapes (typically not displayed on the touch screen) of the virtual keys corresponding to the displayed keys of the FIG. 1 keyboard GUI, as well as illustrating the dots that indicate the key locations.

Having described a particular example of a virtual key activation method, we now refer to the illustration in FIG. 3. The hexagonal shapes $302q$, $302w$, $302e$, etc. illustrate an example of the shapes of the virtual keys, superimposed on the visually-defined keys 102. The example touch location "X" 108 shown in FIG. 1 is also shown in FIG. 3. Typically, the hexagonal (or other) shapes of the virtual keys would not be displayed to the user. Generically, the particular configuration of each virtual key 302 is based on the number and configuration of the key locations in the set of key locations corresponding to the virtual key. Other example configurations will be described later.

Figure 31:
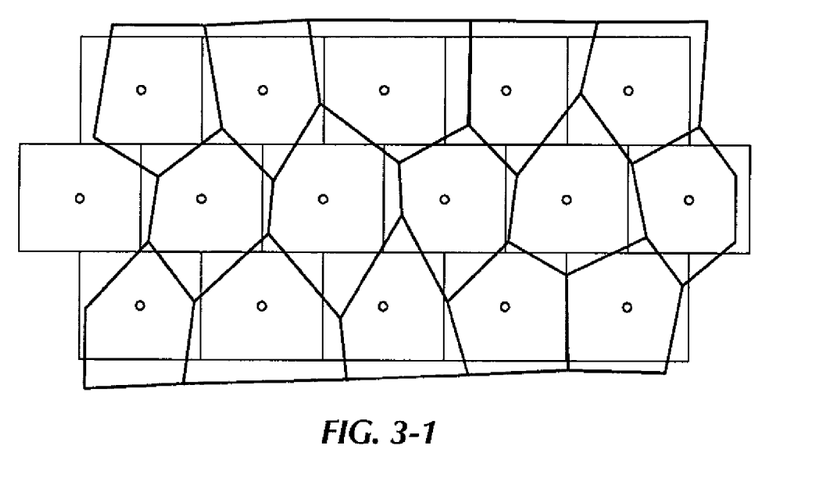

FIG. 3-1 illustrates an example in which, in contrast to FIG. 3, there is not such a regular correspondence between the visual targets and the key locations.

Figure 4:
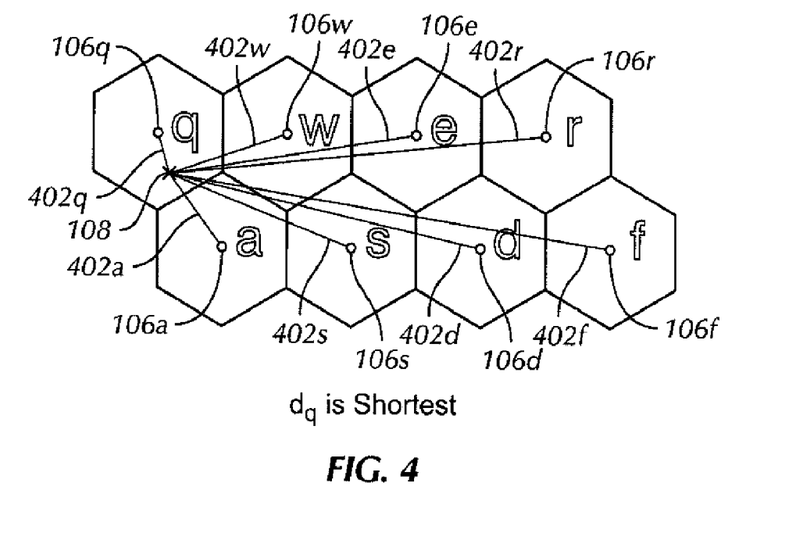
FIG. 4 is a schematic diagram useful to explain the FIG. 2 flowchart.

FIG. 4 illustrates an example of the distance determination step 204 of FIG. 2. Specifically, the length of each line segment $402q$, $402w$, $402e$, etc. represents the distance between the touch location "X" 108 and each respective key locations $106q$, $106w$, $106e$, etc. It can be seen that the line segment 402 having the shortest such length is $402q$, which would be the result of step 208 as applied to the example of FIG. 1 and FIG. 3.

With FIG. 3 in particular as background, we discuss step 206 of the FIG. 2 flowchart. At step 206 (shown as a dashed rectangle), the distances determined at step 204 may be weighted by a weighting factor. For example, each distance may be multiplied by a weighting factor. The weighting factor for each virtual key affects the size of that virtual key. The smaller the weighting factor associated with a first virtual key relative to the weighting factor associated with a second virtual key, the smaller the first virtual key is relative to the second virtual key (that is, the closer a touch location must be to a key location, relatively, to cause activation of the virtual key to which the key location corresponds.) In some examples, the weighting factors are normalized such that a weighting factor of one has no effect on the size of a virtual key, while a weighting factor greater than one has the effect of enlarging a virtual key, while a weighting factor less than one has the effect of diminishing the virtual key. The application of the weighting factors need not be linear. For example, the square root of the distance may be multiplied by the weighting factor.

Figure 5:
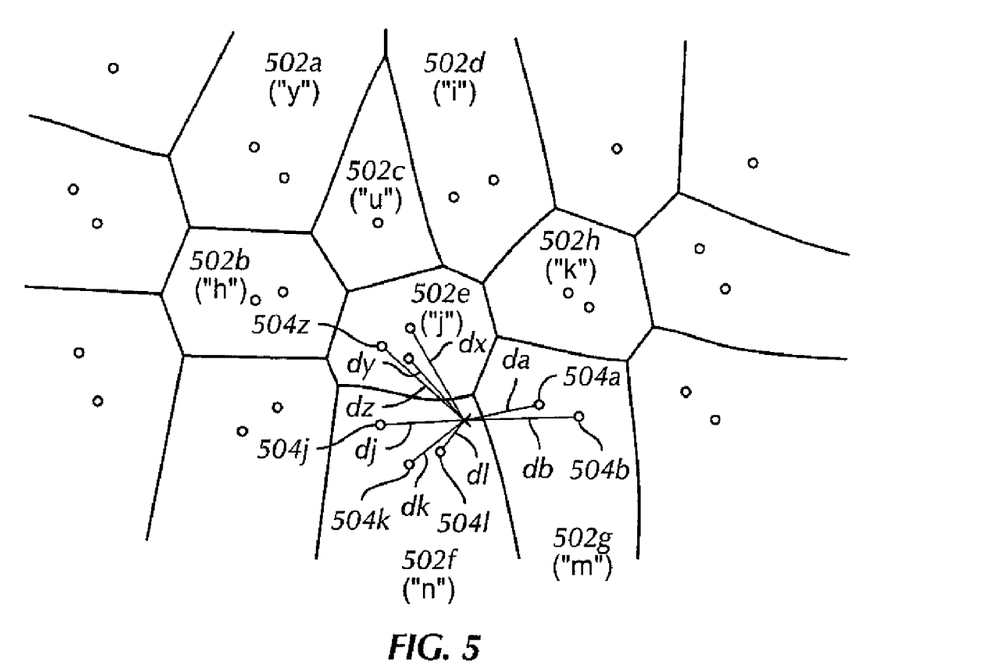
FIG. 5 illustrates an example layout of virtual keys on a touch screen where each of at least one of the virtual keys has a set of greater than one key location corresponding to that virtual key.

We now turn to FIG. 5, which illustrates an example layout of virtual keys on a touch screen where each of at least one of the virtual keys has a set of greater than one key location corresponding to that virtual key. For example, referring to FIG. 5, a plurality of virtual keys (for example, designated by reference numerals 502a through 502h are illustrated. The boundary of each virtual key (502, generally) is a function of the position (and, if applicable, weighting) of the plural key locations corresponding to that virtual key. It is noted that the keyboard graphic actually viewable by the user may not directly coincide with the irregularly-shaped boundaries of the virtual keys 502.

Figure 6:
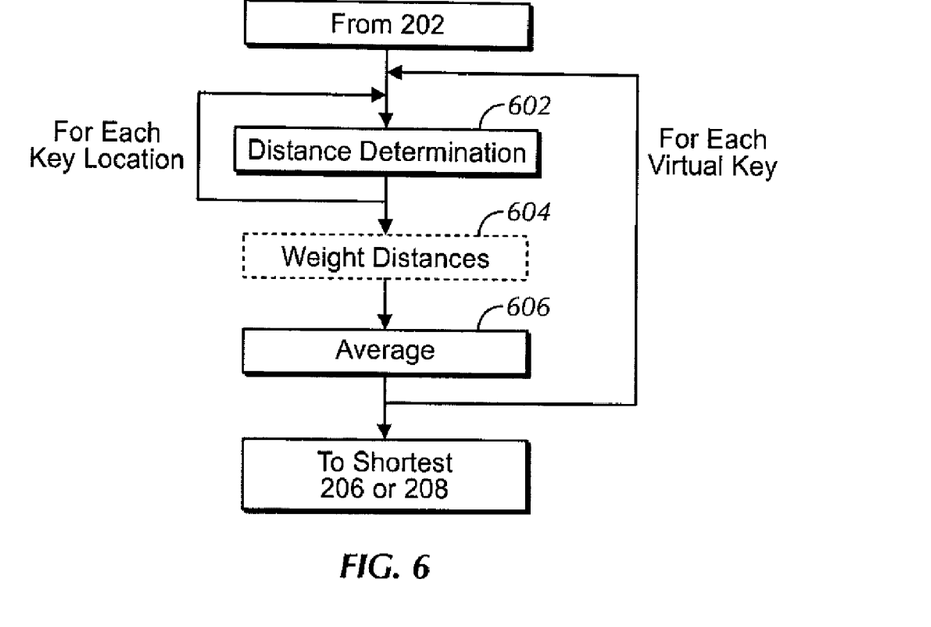
FIG. 6 is a flowchart illustrating a portion of the FIG. 2 flowchart for a virtual key such as is shown in FIG. 5, having more than one key location corresponding to it.

FIG. 6 illustrates steps 602 and 604, which may be included in step 204 of FIG. 2. In particular, step 602 determines, for each key location in the set of at least one key location corresponding to a virtual key, the distance between the touch location and the key location. With regard to the specific example of the virtual "m" key in FIG. 5, step 602 includes determining the distances da and db. The distance provided to step 206 or step 208 (FIG. 2) for the virtual "m" key is then determined, at step 604, as the average of da and db. In some examples, a step 606 (which, like step 206 in FIG. 2, is shown as a dashed rectangle) is included in which the distances determined in step 602 (e.g., da, db and dc) may be weighted before an average is determined at step 604. Some reasons that it may be desired to weight particular key locations corresponding to a virtual key are discussed later.

Referring still to FIG. 6, steps 602 and 604 (and, sometimes, step 606) are also performed for virtual "j" and "n" keys (and the other virtual keys). For the virtual "j" key, distance dx, dy and dz are determined. For the virtual "n" key, distances dh, dk, and dl are determined. In some examples, some optimizations are realized such that the distances are not determined for every virtual key and/or for every key location associated with a particular virtual key.

Referring back to FIG. 2, optional step 206 and step 208 are carried out using the distances determined in the step 604 processing for the each virtual keys. As a result, the activated virtual key is the one virtual key for which there is the shortest physical distance between the key locations, associated with that virtual key, and the touch location.

We now discuss how the key locations are determined, in some examples. While in some examples, the key locations may be predetermined, in other examples, the key locations are dynamically determined. For example, a keyboard interface may be initially activated on a touch screen by processing that detects simultaneous touching of the touch screen by a plurality of fingers, where the particular number may vary by example. In one example, the keyboard interface is only activated if the relative positions of the touching fingers on the touch screen are consistent (within some threshold) with the positions of fingers on an actual keyboard. Once the initial positions of some of the keys (more properly, the initial key locations associated with virtual keys) are determined based on the respective positions of the touching fingers, initial key locations for remaining virtual keys of the keyboard, even though not directly corresponding to touch locations, may be determined. For example, the key locations for the remaining virtual keys of the keyboard may be set to have a predetermined relationship to the key locations for the virtual keys whose key locations are determined directly from the touch locations.

Figure 7:
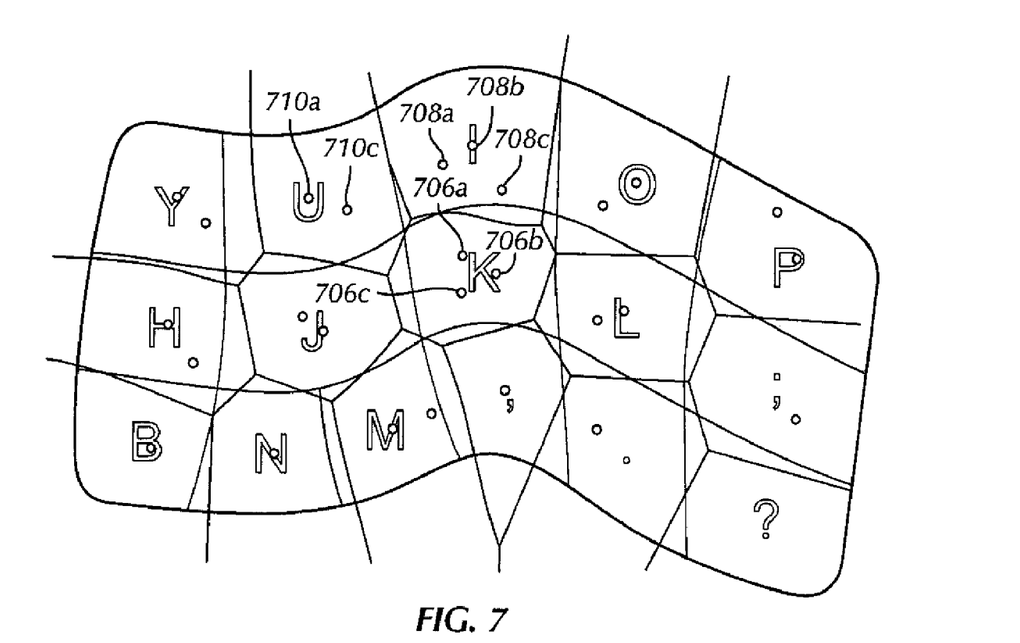
FIG. 7 illustrates an example layout of key locations corresponding to virtual keys on a touch screen based on an initial "touch" by a user of fingers simultaneously in a "home key" position on the touch screen.

FIG. 7 illustrates a portion of a virtual keyboard. The lines 702 indicate the boundaries of the virtual keys, whereas the lines 704 indicate the key boundaries as displayed to the user on the touch screen. The "dots" (for example, 706a, 706b and 706c; 708a, 708b and 708c; and 710a and 710b) are not typically displayed but, rather, indicate key locations for the virtual keys.

In some examples, rather than strictly considering distance between a touch location and key locations, statistical parameters of the distribution of the key locations is taken into account. Thus, for example, a touch location that is "closer" in standard deviation terms to the distribution of key locations for a first virtual key than to the distribution of key locations for a second virtual key is considered to correspond to an activation of the first virtual key. Thus, in one example, a first virtual key has corresponding to it a relatively closely-spaced distribution of key locations, relative to the distribution of key locations corresponding to a second virtual key. With these example distributions of key locations, in order for a touch location to correspond to activation of the a touch location would have to be relatively closer (in physical distance) to the center of the relatively closely-spaced distribution of key locations corresponding to the first virtual key than to the center of the distribution of relatively further-spaced key locations corresponding to the second virtual key.

We now discuss how, in one example, how particular virtual keys come to have multiple key locations associated with them. In particular, when it is determined which virtual key a touch location has activated, that touch location may be considered as an additional key location for the activated virtual key. In some examples, the key locations for the virtual keys are accumulated, although the number of key locations for each virtual key may be limited such that, for example, the key locations corresponding to the touch locations earliest in time may be discarded.

Furthermore, some key locations may be "backed out" based on conditions that occur later in time than when the key locations was first considered to be a key location. One such later-occurring condition is that a later touch condition is determined to correspond to a "backspace" virtual key that, when activated, would nullify the activation of the virtual key to which the to-be backed out key locations corresponds.

In addition, the weights associated with particular virtual keys (see step 202 in FIG. 2 and step 606 in FIG. 6) may be adjusted dynamically. In one example, the weights are adjusted based on the sequence of virtual keys already activated. For example, the weight associated with the most likely next virtual key to be activated, based on the sequence of virtual keys already activated, may be set to be higher (or lower) than the weights associated with other virtual keys. What virtual key is most like to be activated may be determined, for example, using a dictionary (word-based), statistical probability for individual letters (for example, based on statistical frequency of occurrence), or a combination of both. In some examples, virtual keys deemed to be "dangerous" (e.g., whose the result of whose activation may be difficult to reverse) are given a smaller weight. Potential examples of such "dangerous" keys may include, for example, a "delete" key or "cancel" key (for example, the "delete" GUI item 906 in FIG. 9.) Furthermore, in some examples, the slower virtual keys are activated (corresponding, nominally, to more deliberate activation), the less any particular virtual key would be weighted.

The described examples may be particularly useful where the virtual keyboards are small relative to the touch area with which a user may activate a virtual key. With a conventional keyboard (with which, for example, it is determined that a particular virtual key is activated by determining if the touch area is within a boundary corresponding to that virtual key), the touch area may correspond to more than one virtual key.

Figure 8:
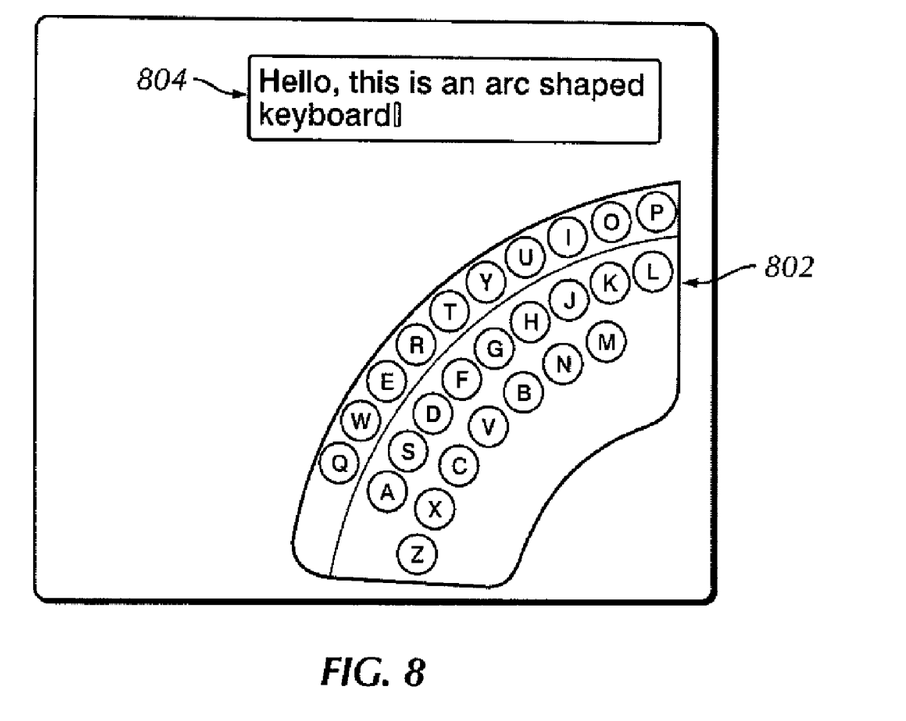
FIG. 8 illustrates an example arc-shaped keyboard, particularly suited for activation of the virtual keys using a thumb.

For example, FIG. 8 illustrates an example of an arc-shaped keyboard that may be particularly suited for thumb activation of the relatively small and close-together virtual keys. The visual display 802 associated with the FIG. 8 keyboard, as well as (nominally) the layout of the key locations used to determine which virtual key is activated) is arc-shaped. An output area 804 is also shown, which provides an indication of the activated virtual keys.

The thumb, for example, is relatively large and difficult to control. The arc-shaped keyboard may be initiated by a particular gesture such as "swiping" the thumb across a corner of the touch screen. The arc-shaped keyboard may be, for example, located in a corner of the touch screen easily reachable for activation of the virtual keys by a thumb of a hand holding the touch screen computer.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of operating a touch screen to activate a virtual GUI item, comprising:
displaying a plurality of activatable virtual GUI items on the touch screen, wherein at least one of the activatable virtual GUI items in the plurality of activatable virtual GUI items has a corresponding set of greater than one GUI item locations;
determining a touch location based on location data pertaining to touch input on the touch screen, wherein the touch input is intended to activate one of the plurality of activatable virtual GUI items;
for each of the plurality of activatable virtual GUI items, determining a distance parameter for that respective activatable virtual GUI item that relates the touch location and one or more GUI item locations corresponding to that respective activatable virtual GUI item, wherein:
determining the distance parameter for each of the at least one activatable virtual GUI items having a corresponding set of greater than one GUI item locations includes for each of these GUI item locations corresponding to that activatable virtual GUI item, determining a distance parameter relating the touch location and that GUI item location, and processing the determined distance parameters for each of the set of greater than one GUI item locations corresponding to that activatable virtual GUI item to determine the distance parameter for that activatable virtual GUI item, and
the distance parameter for each of the at least one activatable virtual GUI items having a corresponding set of greater than one GUI item locations is a statistical parameter characterizing the distribution of the GUI item locations within the set of greater than one GUI item locations corresponding to that activatable virtual GUI item;
processing the determined distance parameters of the plurality of activatable virtual GUI items to determine one of the activatable virtual GUI items; and
generating a signal indicating activation of the determined one of the activatable virtual GUI items.

2. The method of claim 1, wherein:
the plurality of activatable virtual GUI items are virtual keys of a virtual keyboard, and the set of greater than one GUI items locations is a set of one or more key locations;
the determined distance parameter for each virtual key indicates, when considered relative to the determined distance parameters for the other virtual keys, a likelihood that virtual key is the one the touch input is intended to activate; and
processing the determined distance parameters for the virtual keys includes determining from the determined distance parameters the virtual key for which the determined distance parameter indicates a highest likelihood.

3. The method of claim 2, wherein:
determining the distance parameter for each virtual key includes,
for each key location of the set of one or more key locations corresponding to that virtual key, determining a distance parameter relating the touch location and that key location; and
processing the determined distance parameters for each of the set of one or more key locations corresponding to that virtual key to determine the distance parameter for that virtual key.

4. The method of claim 3, wherein:
the determined distance parameter for each virtual key includes an indication of a relationship between a touch location and a distribution of key locations corresponding to that virtual key.

5. The method of claim 4, wherein:
the distribution of key locations corresponding to that virtual key is represented by at least one statistical parameter characterizing the distribution.

6. The method of claim 5, wherein:
the at least one statistical parameter includes standard deviation.

7. The method of claim 3, wherein:
the determined distance parameter for each virtual key is an average of the determined distance parameters for the set of one or more key locations corresponding to that virtual key.

8. The method of claim 3, wherein:
for each key location, the determined distance parameter relating the touch location and that key location is an indication of a physical distance between the touch location and that key location.

9. The method of claim 4, wherein:
for each key location, the determined distance parameter relating the touch location and that key location is an indication of a physical distance between the touch location and that key location.

10. The method of claim 4, wherein:
the distance parameter for each virtual key is an average of the determined distance parameters for the set of one or more key locations corresponding to that virtual key, weighted to account for a relative size of that virtual key.

11. The method of claim 3, wherein:
for each of at least one of the plurality of virtual keys, at least one of the set of one or more key locations corresponding to that virtual key is a touch location determined previously to be intended to activate that virtual key.

12. The method of claim 2, wherein:
determining a distance parameter for each virtual key includes accounting for a relative size of that virtual key.

13. The method of claim 2, wherein:
determining a distance parameter for each virtual key includes heuristic considerations for that virtual key.

14. The method of claim 12, wherein:
the heuristic considerations include considering a meaning of collective input to the touch screen.

15. The method of claim 14, wherein:
considering the collective input includes matching the collective input to a dictionary.

16. The method of claim 14, wherein:
considering the collective input includes considering a likelihood of occurrence of sequences of input.

17. The method of claim 16, wherein:
considering a likelihood of occurrence of sequences of input includes considering a likelihood of occurrence of sequences of a rolling window of input.

18. The method of claim 16, wherein:
considering the collective input includes a combination of considering a likelihood of occurrence of sequence of input and matching the collective input to a dictionary.

19. The method of claim 5, wherein:
determining from the determined distance parameters the virtual key for which the determined distance parameter indicates the highest likelihood includes determining for which virtual key the determined distance parameter indicates a smallest physical distance.

20. The method of claim 6, wherein:
determining from the determined distance parameters the virtual key for which the determined distance parameter indicates the highest likelihood includes determining for which virtual key the determined distance parameter indicates a smallest physical distance.

21. The method of claim 18, wherein:
determining from the determined distance parameters the virtual key for which the determined distance parameter indicates the highest likelihood includes determining for which virtual key the determined distance parameter indicates a smallest physical distance.

22. The method of claim 1, further comprising:
initially determining at least some of the GUI item locations.

23. The method of claim 22, wherein:
initially determining at least some of the key locations includes, for each of the at least some of the key locations, setting that key location to be a touch location.

24. The method of claim 23, wherein:
setting a key location to be a touch location occurs based on detection of touch locations determined based on a plurality of simultaneous touch input.

25. The method of claim 1, wherein the plurality of activatable virtual GUI items are virtual keys of a virtual keyboard, and the one or more GUI item locations corresponding to each of the activatable virtual GUI items are one or more key locations.

26. The method of claim 1, wherein the distance parameter for each of the at least one activatable virtual GUI items having a corresponding set of greater than one GUI item locations is weighted by a weighting factor to account for a size of that activatable virtual GUI item relative to the sizes of the other activatable virtual GUI items in the plurality of activatable virtual GUI items.

27. A computer readable storage medium storing one or more programs, the one or more programs comprising instructions, which when executed by a electronic device with a touch screen display, cause the electronic device to perform a method comprising:

displaying a plurality of activatable virtual GUI items on the touch screen, wherein at least one of the activatable virtual GUI items in the plurality of activatable virtual GUI items has a corresponding set of greater than one GUI item locations;

determining a touch location based on location data pertaining to touch input on the touch screen, wherein the touch input is intended to activate one of the plurality of activatable virtual GUI items;

for each of the plurality of activatable virtual GUI items, determining a distance parameter for that respective activatable virtual GUI item that relates the touch location and one or more GUI item locations corresponding to that respective activatable virtual GUI item, wherein:

determining the distance parameter for each of the at least one activatable virtual GUI items having a corresponding set of greater than one GUI item locations includes for each of these GUI item locations corresponding to that activatable virtual GUI item, determining a distance parameter relating the touch location and that GUI item location, and processing the determined distance parameters for each of the set of greater than one GUI item locations corresponding to that activatable virtual GUI item to determine the distance parameter for that activatable virtual GUI item, and the distance parameter for each of the at least one activatable virtual GUI items having a corresponding set of greater than one GUI item locations is a statistical parameter characterizing the distribution of the GUI item locations within the set of greater than one GUI item locations corresponding to that activatable virtual GUI item;

processing the determined distance parameters of the plurality of activatable virtual GUI items to determine one of the activatable virtual GUI items; and generating a signal indicating activation of the determined one of the activatable virtual GUI items.

28. The computer-readable medium of claim 27, wherein:
the plurality of activatable virtual GUI items are virtual keys of a virtual keyboard, and the set of greater than one GUI items locations is a set of one or more key locations;

the determined distance parameter for each virtual key indicates, when considered relative to the determined distance parameters for the other virtual keys, a likelihood that virtual key is the one the touch input is intended to activate; and processing the determined distance parameters for the virtual keys includes determining from the determined distance parameters the virtual key for which the determined distance parameter indicates a highest likelihood.

29. The computer-readable medium of claim 27, wherein:
determining the distance parameter for each virtual key includes, for each key location of the set of one or more key locations corresponding to that virtual key, determining a distance parameter relating the touch location and that key location; and processing the determined distance parameters for each of the set of one or more key locations corresponding to that virtual key to determine the distance parameter for that virtual key.

30. The computer-readable medium of claim 29, wherein:
the determined distance parameter for each virtual key is an average of the determined distance parameters for the set of one or more key locations corresponding to that virtual key.

31. The computer-readable medium of claim 29, wherein:
for each key location, the determined distance parameter relating the touch location and that key location is an indication of a physical distance between the touch location and that key location.

32. The computer-readable medium of claim 30, wherein:
for each key location, the determined distance parameter relating the touch location and that key location is an indication of a physical distance between the touch location and that key location.

33. The computer-readable medium of claim 30, wherein:
the distance parameter for each virtual key is an average of the determined distance parameters for the set of one or more key locations corresponding to that virtual key, weighted to account for a relative size of that virtual key.

34. The computer-readable medium of claim 29, wherein:
for each of at least one of the plurality of virtual keys, at least one of the set of one or more key locations corresponding to that virtual key is a touch location determined previously to be intended to activate that virtual key.

35. The computer-readable medium of claim 27, wherein:
determining a distance parameter for each virtual key includes accounting for a relative size of that virtual key.

36. The computer-readable medium of claim 27, wherein:
determining a distance parameter for each virtual key includes heuristic considerations for that virtual key.

37. The computer-readable medium of claim 36, wherein:
the heuristic considerations include considering a meaning of collective input to the touch screen.

38. The computer-readable medium of claim 37, wherein:
considering the collective input includes matching the collective input to a dictionary.

39. The computer-readable medium of claim 37, wherein:
considering the collective input includes considering a likelihood of occurrence of sequences of input.

40. The computer-readable medium of claim 31, wherein:
determining from the determined distance parameters the virtual key for which the determined distance parameter indicates the highest likelihood includes determining for which virtual key the determined distance parameter indicates a smallest physical distance.

41. The computer-readable medium of claim 32, wherein:
determining from the determined distance parameters the virtual key for which the determined distance parameter indicates the highest likelihood includes determining for which virtual key the determined distance parameter indicates a smallest physical distance.

42. The computer-readable medium of claim 33, wherein:
for each key location, the determined distance parameter relating the touch location and that key location is an indication of a physical distance between the touch location and that key location.

43. The computer-readable medium of claim 32, wherein:
determining from the determined distance parameters the virtual key for which the determined distance parameter indicates a highest likelihood includes determining for which virtual key the determined distance parameter indicates a smallest physical distance.

44. The computer-readable medium of claim 27, further comprising:
initially determining at least some of the GUI item locations.

45. The computer-readable medium of claim 44, wherein:
initially determining at least some of the GUI item locations includes, for each of the at least some of the GUI item locations, setting that GUI item location to be a touch location.

46. The computer-readable medium of claim 45, wherein:
setting a GUI item location to be a touch location occurs based on detection of a touch locations determined based on a plurality of simultaneous touch input.

47. The computer-readable medium of claim 27, wherein the distance parameter for each of the at least one activatable virtual GUI items having a corresponding set of greater than one GUI item locations is weighted by a weighting factor to account for a size of that activatable virtual GUI item relative to the sizes of the other activatable virtual GUI items in the plurality of activatable virtual GUI items.

48. A electronic device, comprising:
a touch screen display;
a processor;
a memory; and
one or more programs, wherein the one or more programs are stored in the memory and configured to be executed by the processor, the one or more programs including instructions for:
displaying a plurality of activatable virtual GUI items on a touch screen, wherein at least one of the activatable virtual GUI items in the plurality of activatable virtual GUI items has a corresponding set of greater than one GUI item locations;
determining a touch location based on location data pertaining to touch input on the touch screen, wherein the touch input is intended to activate one of the plurality of activatable virtual GUI items;
for each of the plurality of activatable virtual GUI items, determining a distance parameter for that respective activatable virtual GUI item that relates the touch location and one or more GUI item locations corresponding to that respective activatable virtual GUI item, wherein:
determining the distance parameter for each of the at least one activatable virtual GUI items having a corresponding set of greater than one GUI item locations includes for each of these GUI item locations corresponding to that activatable virtual GUI item, determining a distance parameter relating the touch location and that GUI item location, and processing the determined distance parameters for each of the set of greater than one GUI item locations corresponding to that activatable virtual GUI item to determine the distance parameter for that activatable virtual GUI item, and
the distance parameter for each of the at least one activatable virtual GUI items having a corresponding set of greater than one GUI item locations is a statistical parameter characterizing the distribution of the GUI item locations within the set of greater than one GUI item locations corresponding to that activatable virtual GUI item;
processing the determined distance parameters of the plurality of activatable virtual GUI items to determine one of the activatable virtual GUI items; and
generating a signal indicating activation of the determined one of the activatable virtual GUI items.

49. The electronic device of claim 48, wherein the distance parameter for each of the at least one activatable virtual GUI items having a corresponding set of greater than one GUI item locations is weighted by a weighting factor to account for a size of that activatable virtual GUI item relative to the sizes of the other activatable virtual GUI items in the plurality of activatable virtual GUI items.

* * * * *

UNITED STATES PATENT AND TRADEMARK OFFICE
CERTIFICATE OF CORRECTION

| | | |
|---|---|---|
| PATENT NO. | : 7,844,914 B2 | Page 1 of 1 |
| APPLICATION NO. | : 11/228737 | |
| DATED | : November 30, 2010 | |
| INVENTOR(S) | : Bartley K. Andre et al. | |

It is certified that error appears in the above-identified patent and that said Letters Patent is hereby corrected as shown below:

On Title page 2, in column 1, under "U.S. Patent Documents", line 30, delete "Beier et al." and insert -- Meier, et al. --, therefor.

In column 1, line 8, after "10/903,964" insert -- , --.

In column 3, line 17, delete "and or" and insert -- and/or --, therefor.

In column 5, line 32, delete "distance" and insert -- distances --, therefor.

In column 5, line 33, delete "dh, dk," and insert -- dj, dk --, therefor.

Signed and Sealed this
Twenty-fifth Day of October, 2011

David J. Kappos
*Director of the United States Patent and Trademark Office*